United States Patent [19]

Loeffler et al.

[11] 3,733,677
[45] May 22, 1973

[54] APPARATUS AND METHOD TO PRODUCE CYLINDRICAL ARTICLES

[75] Inventors: Romain Eugene Loeffler, Defiance; Vernon Charles Plotts, Waterville, both of Ohio

[73] Assignee: Johns-Manville Corporation, New York, N.Y.

[22] Filed: Sept. 29, 1970

[21] Appl. No.: 76,552

[52] U.S. Cl. ............... 29/411, 29/33 K, 29/208 R, 29/234, 29/429, 53/13, 53/204
[51] Int. Cl. .................................... B23p 17/00
[58] Field of Search .................... 29/419, 428, 473.3, 29/474.2, 411, 417, 517, 234, 33 K, 429, 208 R; 93/35 MW, 77 CL, 94 M; 264/258; 53/33-34, 13, 204, 36

[56] References Cited

UNITED STATES PATENTS

| | | | |
|---|---|---|---|
| 3,283,470 | 11/1966 | Oelze | 53/33 |
| 2,113,078 | 4/1938 | Campbell | 53/13 |
| 2,418,657 | 4/1947 | Moritz | 53/204 |
| 2,521,833 | 9/1950 | Dahl | 53/13 |
| 2,615,606 | 10/1952 | McDermott | 53/204 |
| 3,611,674 | 10/1971 | Glickston | 53/33 X |
| 2,433,271 | 12/1947 | Grant | 29/411 |
| 3,109,231 | 11/1963 | Johnson | 29/411 |
| 3,241,224 | 3/1966 | Banister et al. | 29/429 |
| 3,530,565 | 9/1970 | Lanza et al. | 29/429 X |
| 3,639,970 | 2/1972 | Larkin | 29/411 |
| 2,874,459 | 2/1959 | Haldeman | 29/517 |
| 2,988,812 | 6/1961 | Ohlinger | 29/517 |
| 2,394,895 | 2/1946 | Burhans | 29/419 X |
| 2,540,272 | 2/1951 | Malmstrom | 29/419 X |
| 1,913,828 | 6/1933 | Brennan | 93/35 MW |
| 2,716,259 | 8/1955 | Mott | 93/35 MW |
| 2,683,500 | 7/1954 | Goodloe | 29/419 X |
| 3,008,859 | 11/1961 | Smack | 156/189 X |
| 2,724,176 | 11/1955 | White | 29/419 |
| 3,026,609 | 3/1962 | Bryan | 29/419 |
| 3,067,504 | 12/1962 | Lubben | 29/419 |
| 3,562,895 | 2/1971 | Neibergall | 29/419 |

Primary Examiner—Charlie T. Moon
Attorney—John A. McKinney and Robert M. Krone

[57] ABSTRACT

A method and apparatus of applying stocking sheaths to cylindrical articles involving passing the articles longitudinally through the interior of a cylindrical mandrel bearing on its outer surface a supply of continuous stocking material. As the articles emerge from the mandrel they pickup overhanging stocking material and draw it off the mandrel. The interconnecting stocking between successively emerging articles is severed by shearing means. Spacing sufficient to provide stocking portions overhang the ends of the articles is achieved by driving the articles emerging from the mandrel at a greater speed than they are driven through the mandrel. Filter elements are formed of hollow, fibrous cylinders covered with a cloth stocking by tucking the overhanging ends of the stocking into the hollow ends of the cylinders.

24 Claims, 13 Drawing Figures

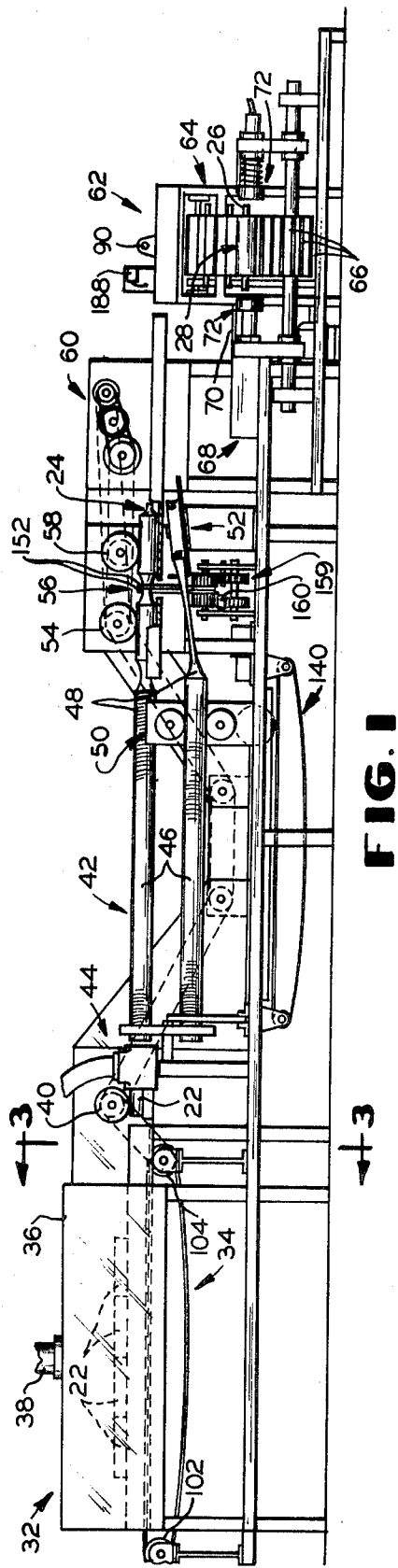
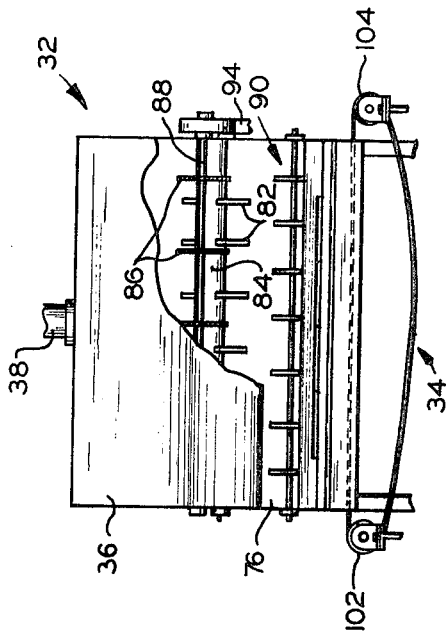
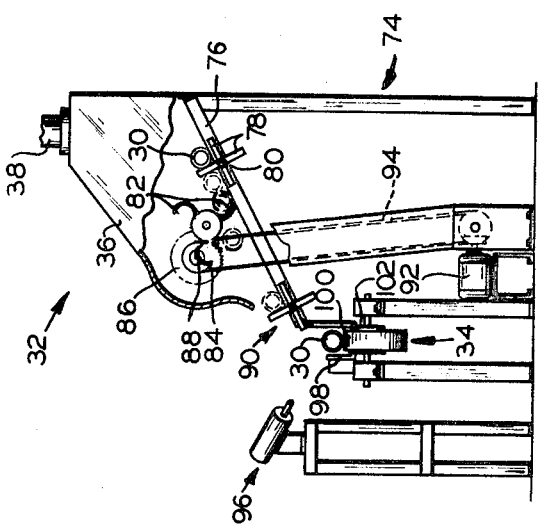
INVENTORS
ROMAIN E. LOEFFLER
VERNON C. PLOTTS
BY
John A. McKinney
ATTORNEYS

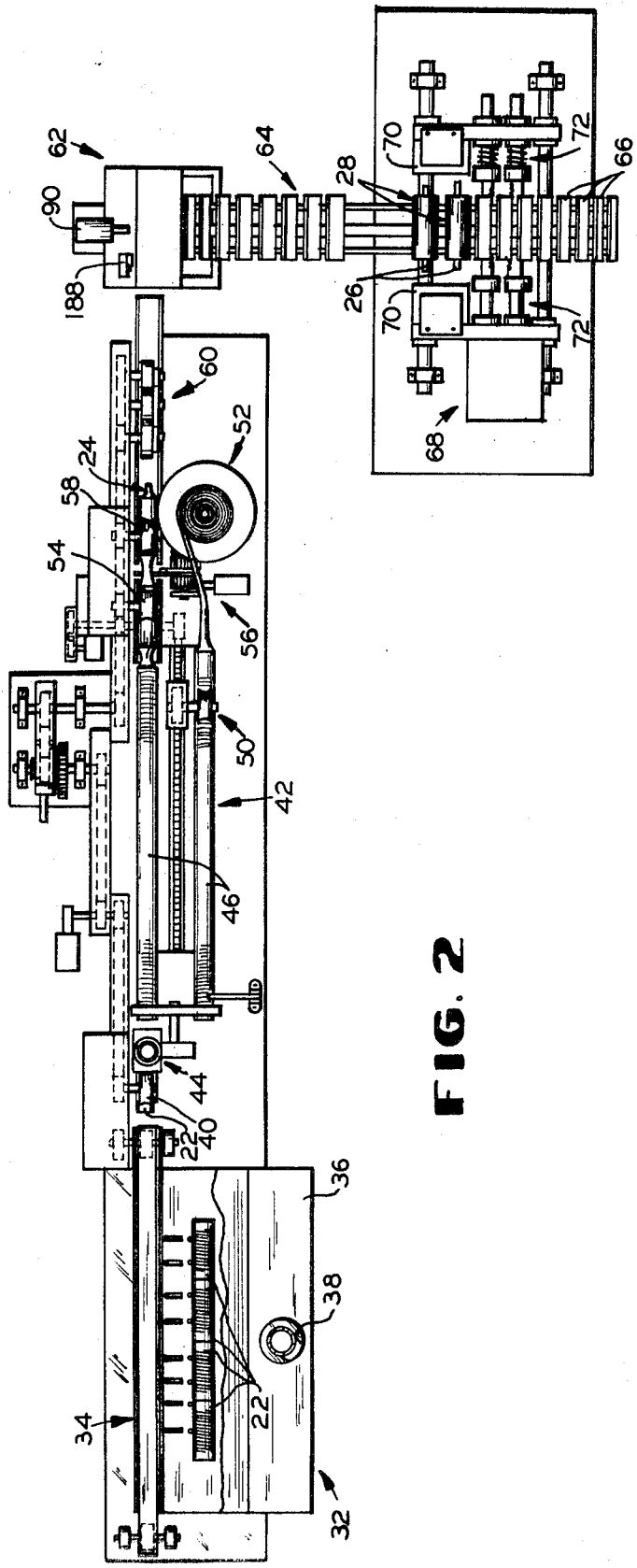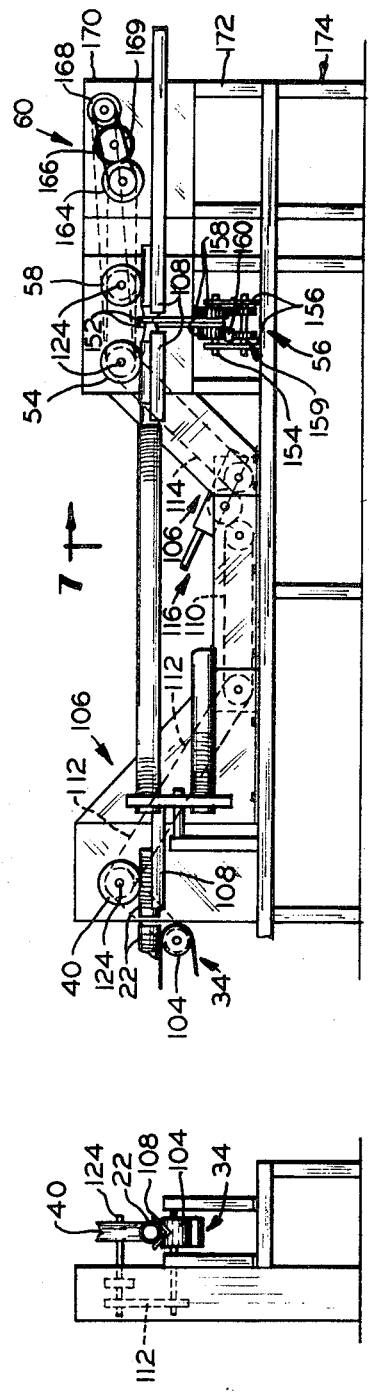

INVENTORS
ROMAIN E. LOEFFLER
VERNON C. PLOTTS
BY
*John A. McKinney*
ATTORNEYS

APPARATUS AND METHOD TO PRODUCE CYLINDRICAL ARTICLES

BACKGROUND OF THE INVENTION

Prior to the development of the present machinery, filter tubes having stocking coverings were assembled one at a time by hand operation. In this hand operation, cut to size tubes were inserted one at a time into one end of a mandrel. The mandrel was of a convenient length to be used in a generally vertical orientation by an attendant, and stocking covering was forced over the length of the mandrel's outside surface before any tubes were inserted in the end. Forcing the stocking over the mandrel stretched the stocking to a periphery greater than that of the tube to enable the stocking to pass over the tube. After insertion of a tube, the attendant worked the stocking along the mandrel over the end within which the tube was not quite fully inserted, over the exposed portion of the tube, and pulled a sufficient amount of stocking past the tube to overhang the previously exposed portion of the tube. The extended portion of the tube, now covered by the stocking, was pulled, stocking attached thereto, from the mandrel. This caused the stocking to completely enclose the tube as it followed the tube off the mandrel. The tube was pulled sufficiently clear of the mandrel so that when the trailing stocking was severed with a pair of scissors, there was an overhang of stocking on this end of the tube, duplicating that on the front end. The stocking which is also left overhanging the mandrel now had to be forced back onto the mandrel before another tube could be inserted and the procedure repeated. The overhanging ends were then tucked into the ends of the tube and tube cores inserted into the ends, forcing the stocking ends against the inside of the tubes.

The present machinery eliminates all of the above hand operations except for insertion of the stocking ends and initial insertion of the tube cores. The machinery then completes the insertion of the tube cores once they have been properly positioned for entry into the tubes. The machine further incorporates the use of long lengths of filter tube and stocking or stocking coils in place of the cut-to-size coverings and tubes.

SUMMARY

The present apparatus and method relates to machinery for producing covered cylindrical articles, of which one form would be tubes, and more particularly, to machinery for assembling stocking covers on filter tubes with the ends of the covers tucked into the tube and tube cores inserted in the ends of the tube, forcing the ends of the stocking against the inside wall of the tube to form a filter unit. Particular use of stocking coils is made in obtaining the final stocking covers.

Machinery of this nature can consist of a powered saw with numerous cutting blades for severing filter tube stock to obtain sized tubes of the proper length. A transfer table having indexing means for stock and tubes plus a conveyor attached thereto is combined with the saw. The conveyor is integral with a dust collector and means for directing a plurality of tubes, consisting of a friction roller drive for driving tubes piece against piece along a guide track, toward means for applying a continuous length of covering material such as stocking. Mandrels are used to apply the covering material to the outer periphery of the tubes which mandrels are alternately rotatable from a supply to operative position to receive and dispense stocking from the outer surface of the mandrel. When tubes are pushed piece against piece through the inside of a mandrel covered with stocking in the dispensing or operative position, the stocking is engaged by the tubes leaving the mandrel which pull the stocking along to thereby cover those tubes. A separating means adjacent the exit of the mandrels, consisting of a pair of drive rollers coordinated with the friction roller drive, is provided to separate the butted filter tubes while within the stocking. A severing means, in the form of a flying shear, is located between the pair of rollers to sever the stocking intermediate of the separation between the tubes. The separating means are followed by a printer to mark each stocking cover and a lateral transfer platform having a limit switch and plunger in conjunction with an inclined plane for laterally transferring the stocking covered tube to a flight conveyor. The conveyor carries the covered tubes past an attendant who tucks the ends of the stocking covers into the tube and partially inserts the tube cores in proper alignment within the tube ends. A combination nozzle-ram machine completes the machinery and the assembly by final insertion of the cores with the rams converging on both sides thereof, as well as blowing out the inside of the tube with high velocity air to remove any loose residual material caused by the cores abrading the tubes upon insertion.

Clearly, the machinery could be more highly automated, or in the reverse sense, the process of covering a plurality of articles could also be practiced manually.

The machinery automates into one process line operations previously requiring numerous manual operations to assemble filter units having stocking covers and tube cores. Further, machinery has been developed which is useful for processing any cylindrical article which requires covering with a stocking material, or sheathing which is flexible, such as plastic and rubber sheeting. The machinery gives higher production due to the increased speed of operation, and the use of continuous lengths of stocking and filter tube stock increases process efficiency resulting in a more economical filter unit. The continuous nature of the machinery operation also aids in achieving a higher production.

BRIEF DESCRIPTION OF THE DRAWINGS

FIG. 1 is an elevational view of the line machinery;

FIG. 2 is a plan view of the machinery illustrated in FIG. 1;

FIG. 3 is an end view of the saw, transfer table and conveyor taken along line 3—3 of FIG. 1;

FIG. 4 is an elevational view of the saw, transfer table and conveyor illustrated in FIG. 3;

FIG. 5 is a fragmentary elevational view of the driven rollers, gear shift, flying shear, printer and conveyor;

FIG. 6 is an end view of the drive roller and conveyor illustrated in FIG. 5;

FIG. 10 is a fragmentary elevational view of the lateral transfer mechanism;

FIG. 11 is an end view of the lateral transfer mechanism illustrated in FIG. 10;

FIG. 12 is a fragmentary plan view of the flight conveyor, rams and air nozzles; and FIG. 13 is an elevational view of the flight conveyor, rams, and air nozzles illustrated in FIG. 12.

DESCRIPTION OF THE PREFERRED EMBODIMENT

Figure 8:
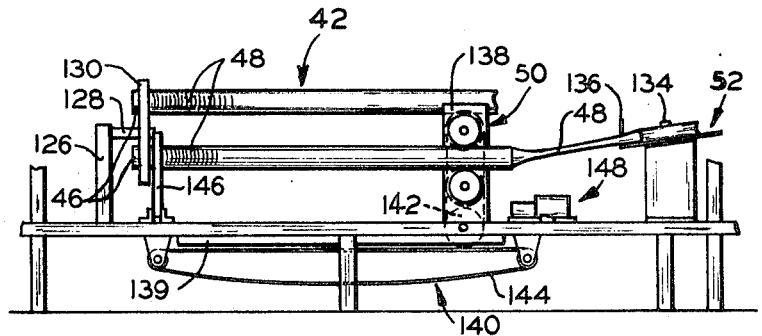
FIG. 8 is a fragmentary elevational view of the stocking machine.

FIGS. 1 and 2 illustrate a line of machinery for assembling filter tubes 22, stocking covers 24 and tube cores 26 into filter units 28. The work flow is from left to right with suitable lengths of filter tube stock entering the far side of the combination saw-transfer table 32 where the tube stock is cut into pieces of a predetermined size or filter tubes 22 which are deposited on the belt conveyor 34. A hood 36 with a stack 38 attached to the top of the hood 36 covers the saw-transfer table. The stack 38 is connected to a collector system (not illustrated) which collects the residual material resulting from the cutting operation of the saws. The belt conveyor 34 transfers the cut pieces of tube 22 to the drive roller 40 which pushes tube 22 against tube into the stocking machine 42. The external surface of the tubes 22 is cleaned of loose residual material before entering the stocking machine 42 by a dust collector 44 under negative pressure located in front of the stocking machine 42. The tubes 22 enter the inside of the upper or operative mandrel 46 of the stocking machine 42 which is covered with a stocking 48 overhanging the exit end of the mandrel 46. The tubes 22 exiting the mandrel 46 engage the stocking 48 and carry it along thereby pulling the stocking 48 off the mandrel. The stocking 48 is placed on the mandrel 46 in the lower or inoperative position by power driven feeder rollers 50, supplied by a storage disc 52 containing the stocking coil 48. Two mandrels 46 are incorporated into the stocking machine 42 to allow one mandrel 46 to receive stocking 48, while the other mandrel 46 is dispensing stocking.

Upon leaving the stocking machine 42, the stocking covered tubes 22 are engaged by the separating roller 54 which by its rotation imparts to the tube 22 and attached stocking 48 longitudinal displacement at a speed greater than that imparted by the drive roller to the abutting tube 22. Thus, the tubes are separated upon leaving the stocking machine 42. The tubes 22 are now only interconnected by the stocking 48. A flying shear 56 is used to subsequently sever the stocking creating independent tube 22 and stocking cover 24 assemblies. The shear 56 is located between the separating roller 54 and a traction roller 58 located downstream of the separating roller 54. The traction roller 58 maintains tension on the stocking 48 between the rollers 54 and 58 to assure a clean cut by the shear 56. The individual tube 22 and stocking cover 24 assemblies then pass on to the printer 60 where identification is placed on the stocking cover 24 of each tube 22. A lateral transfer platform 62 then transfers the assemblies to a slat type conveyor 64 having flights 66 attached transverse of the conveyor over its entire face for receiving one assembly each. The flight conveyor 64 is indexed to pass two flights 66 at a time past the transfer platform 62, and the flights are open ended to accommodate insertion of tube cores 26 into the assemblies. The tube cores 26 are inserted manually after the ends of the stocking covers 24 are manually tucked into the ends of the tubes. This procedure is performed while the assemblies are on the flight conveyor 64 between the transfer platform 62 and the nozzle-ram machine 68. The tube 22 and stocking cover 24 assemblies, with the tube cores partially inserted and reasonably aligned, are advanced to the nozzle-ram machine 68 where the rams 70 converge on the tube cores 26 to complete insertion of the cores 26 into the tubes 22 to form a filter unit 28. The nozzle-ram machine 68 is a tandem mechanism for handling two assemblies at a time with the result that the machine 68 is actuated only once for every two indexes of the trough conveyor 64. The assembly process is completed by an air blast from the nozzles 72 to blow any loose residual material from the inside of the filter unit.

The preferred embodiment is a line for assembling a stretchable, elastic type woven or knitted stocking 48 over tubes 22 of resin reinforced glass fibers with perforated metallic tube cores 26 for securing the ends of the stocking 48 to the inside of the tubes 22, as well as adding support to the filter unit 28. The filter 28 is of an outside-in-nature, with respect to flow and, therefore, the tubes are grooved on the outer surface to expand surface area and extend the fouling life of the filter. Clearly, other cylindrical articles and covers are processable by the line machinery.

Referring to FIGS. 1 through 13, the machinery line illustrated in FIGS. 1 and 2 can be more clearly understood by considering it as a series of components. FIGS. 3 and 4 illustrate the saw-transfer table 32 with a belt conveyor 34 attached. The saw-transfer table 32 is supported by a frame 74 consisting of structural steel legs, cross ties, and braces. Single lengths of tube stock 30 are supplied to the upper end of the inclined table 76 from a supply source not illustrated, such as an automatic feeder, or manually by an attendant. The tube stock 30 is induced by gravity to move down the table 76 until it engages a series of feeder indexing fingers 78. The fingers are mounted in four equally spaced rows over the circumference of a rotatable rod 80 and extend over the length of the table 76. As the rod 80 is rotated a quarter revolution at a time, one length of tube stock 30 is fed to waiting carrier hooks 82 mounted on a drum 84 which is rotatable and also extends over the length of the table 76. Three rows of hooks 82 are equally spaced over the circumference of the drum 84 and each row has a sufficient number of hooks 82 to support the individual filter tubes 22 into which the tube stock 30 is cut upon being passed by the hooks 82 through the path of the saw blades 86. The saw blades are adjustable in number and position along the length of the drive shaft 88 which extends over the length of the table 76 to enable various sizes of filter tube pieces 22 to be cut by the saw blades 86. Upon being cut, the filter tubes are deposited on the table 76 where again gravity induces the tubes 22 to roll downward until engaged by the discharge indexer 90, which duplicates the construction of the assembly described above for the feeder indexing fingers 78. The drive shaft 88 for the saw blades 86 is power driven by an electric motor 92 and belt drive 94. The drum 84, discharge indexer 90, and feeder indexing fingers 78 assembly are mechanically linked to index in unison upon a single from a photocell 96 sighting across the belt conveyor 34. When the last tube 22 is transferred by the conveyor 34 past the table 76, the photocell 96 signal actuates the linkage resulting in a group of tubes 22 being discharged onto the conveyor 34 while another length of tube stock 30 is fed to the saw blades 86. The discharge onto the conveyor 34 is accomplished by a quarter revolution of the discharge indexer 90.

A guard 98 enclosing the bottom and sides of the top of the conveyor belt 100 maintains reasonable alignment of the tubes 22 on the top of the belt 100. The belt 100 is supported by an idler drum 102 and drive drum 104 with the drive drum driven by a chain and sprocket loop (not illustrated) interconnected to the main line drive 106 illustrated in FIG. 5. The conveyor 34 deposits the tubes 22 onto a guide track 108 which directs them to the drive roller 40 illustrated in FIG. 5. The conveyor is interconnected to the line drive 106 to assure synchronization of the conveyor 34 belt speed with that of the drive roller 40, thereby giving a smooth transition of tubes 22 from conveyor 34 to drive roller 40.

Figure 7:
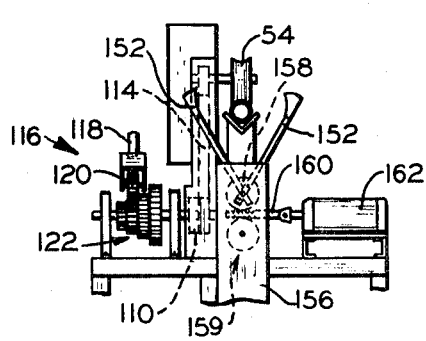
FIG. 7 is a sectional view of the separating rollers taken along line 7—7 of FIG. 5.

FIGS. 5, 6 and 7 illustrate, in addition to the drive roller 40, the separating and traction rollers 54 and 58, plus the interconnecting drive components. The components which make the rollers 40, 54 and 58 an integral drive are the chain and sprockets which make up the drive loop 110 and interconnecting loops 112 and 114. Loop 112 interconnects the drive loop 110 and drive roller 40. Loop 114 interconnects drive loop 110 and the separating traction rollers 54 and 58. In addition, a gear shift 116 is provided consisting of the handle 118 on which is mounted an engaging gear 120. The handle 118 is swingably mounted and slidable parallel to the axis of rotation to engage selectively the face of various diameter drive gears 122 which are driven by the drive loop 110. The gear shift allows the separating and traction rollers 54 and 58 to be driven at a variety of speeds which are in excess of but correlated to the speed of the drive roller 40. The rollers 40, 54 and 58 are mounted on the stub shafts 124, the other ends of which are attached to sprockets within the loops 110, 112 and 114 of the integral drive. Surfaces of the rollers 40, 54 and 58 are covered with a resilient material of sufficient frictional characteristics to prevent slippage between rollers 40, 54 and 58, and tubes 22. Slippage between rollers 40, 54 and 58 and tubes 22 is further avoided by pressure applied to the tubes 22 from the rollers 40, 54 and 58 when contact is made, and contouring the face of the rollers 40, 54 and 58 to the cross section of the tubes.

Figure 9:
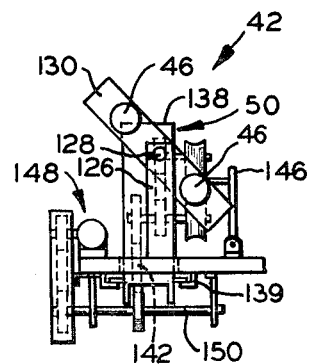
FIG. 9 is an end view of the stocking machine illustrated in FIG. 8.

FIGS. 8 and 9 illustrate the stocking machine 42 consisting of mount 126 to which a cantilevered shaft 128 is journaled for rotation of the shaft 128 about its longitudinal axis. Two mandrels 46 are connected to and supported by the shaft 128 through a box member 130 symmetrically attached to the shaft 128. The ends of the mandrels pass through the box member 130 to provide access to the inside of the mandrels 46, which are hollow. The mandrels 46 are rotatable about the shaft 128 to interchange them between the upper or operative position, and lower or inoperative position. Also illustrated are a stocking coil 48 on a storage disc 52 which has retaining and guide pins 134 and 136, respectively. The stocking coil 48 is illustrated being fed onto the mandrel 46 in the inoperative position, while the other mandrel 46 is maintained in the operative position having already received the proper amount of stocking 48. The stocking 48 is fed onto the mandrel 46, after an initial manual start, or set-up, by a pair of powered feeder rollers 50, which frictionally engage the stocking 48 and move the stocking 48 over the stationary mandrel 46 by rotation of the rollers 50. The rollers 50 are attached to a movable support 138 and driven off of a stiff chain drive 140 along which the drive sprocket 142 moves. Drive sprocket 142 connects the chain drive 140 to the chain loop 144 of rollers 50. The support is manually movable in the longitudinal direction of the mandrels 46 along a way 139. The way 139 allows the support 138 to be moved along the length of the mandrel and to be disengaged from the mandrel by moving clear of the free end of the mandrel when the mandrel is to be rotated. A clamp 146 is provided to engage the inoperative mandrel and thereby maintain the position of both mandrels once they have been rotated into position. The stiff chain drive 140 is powered by an independent motor-gear drive 148 through an interconnecting shaft 150.

Alternative drives for the rollers such as belt and pulley and alternative techniques for interchanging mandrels such as lateral displacement on a pendulously supported mandrel are available. The rollers are illustrated as top or bottom engaging with contoured faces, but could also have other orientations such as being side mounted, and other configurations such as "V" grooved. Such variations are anticipated and should not restrict the breadth of the present machinery line or process. In like sense, other ways of storing and and feeding stocking 48 into the stocking machine 42, such as sliding clamps which engage the stocking 48 on the mandrel 46 and move the stocking forward where it is released and the clamps return to repeat the motion, are available and the present apparatus should not be limited to the particular method illustrated.

Returning to FIGS. 5, 6 and 7, it can be seen that the drive roller 40 engages each tube 22 and pushes the tube against a preceding tube in endless progression into the inside of the mandrel 46 in the upper or operative position and out the other side. As the tubes 22 leave the mandrel 46, each in turn engages the stocking 48 which encompasses the end of the mandrel overhanging it in a restrictive manner caused by the diameter of the mandrel being large enough to stretch the stocking 48 when placed over it. While the machine is particularly suitable for processing stockings 48 of an elastic nature by overcoming the difficulty of stretching the stocking 48 over the tube when the relaxed perimeter of the stocking 48 is smaller than the outside perimeter of the tube 22, clearly, other stocking material could be used if flexible enough to overhang the mandrel and any cylindrical article could be covered. The tubes then carry the stocking 48 along, pulling the stocking 48 off the mandrel 46. Tube 22 and stocking 48 are then engaged by the separating roller 54 which turns at a higher rate of speed than the drive roller 40, thereby advancing the tube 22 and stocking 48 thereunder faster than the following line of butted tubes is advanced by the drive roller 40. Thus, a separation of tubes results to allow the flying shear 56 to pass between the tubes and sever the stocking 48 which interconnects the tubes. To maintain tension on the stocking 48 during passage of the shear 56, a traction roller 58 is provided adjacent the separating roller 54 on the downstream side to firmly maintain the position of the prior tube 22 and stocking 48 relative to the tube 22 and stocking 48 beneath the separation roller 54. Once the stocking 48 is severed, an independent tube 22 and stocking cover 24 assembly is created which passes on to the printer 60 for proper marking of the stocking cover 24.

The flying shear 56 consists of two double-edged knife blades 152 capable of cutting on both the forward and return passes. The knife blades 152 are attached to spur gears 158 which are pivotally mounted on a support shaft 154 supported by two support plates 156. A double rack 160 actuated by a pneumatic cylinder 162 drives one of the spur gears 158 directly and the other gear 158 through a gear train 159 in unison with the first gear 158 but in the counter direction. The blades are in sliding contact and positioned to maintain their point of intersection on a vertical line through the center of tube 22.

Again, other means of severing the stocking 48, such as a circular rotating blade, are available and, therefore, the means illustrated should not be viewed in a restrictive sense of limiting the breadth of the machinery line.

The printer 60 consists simply of a marking wheel 164 whose periphery engages both the stocking covers 24 leaving the traction roller 58 and the inking wheel 166 whereby the raised, scribed surface on the marking wheel periphery receives ink which is deposited on the stocking 24 covers upon rotation of the wheel. A drive wheel 168 is connected to the marking wheel 164 by a belt 169 and to the separation and traction roller drive by chain and sprocket. Thus, the rollers 54 and 58 plus marking wheel are driven with identical peripheral speed which in turn is identical to the speed of the tube 22 and stocking cover 24 assemblies. The result is a contact between stocking covers and wheel 164 and rollers 54 and 58 free of slippage. The printer 60 is supported by a backing plate 170 attached to an intermediate frame 172 which is a continuation of the saw-transfer table frame 74. Both frames 74 and 172 are segments of the line base 174 by virtue of being structurally tied together with the support frames of all the line components. Thus, the line of machinery has one common base 174 consisting of structural steel legs, cross ties and braces.

Up to this point in the assembly process, the tubes have travelled longitudinally through the line machinery. Insertion of the tube cores into the tube 22 and stocking cover 24 assemblies requires that there be greater access to the ends of the tubes than the separation developed by roller 54. The trough conveyor 64 is introduced into the line at this point in an orientation transverse to the guide track 108 from which the work is to be deposited on the trough conveyor 64. To make this right angle transfer a smooth one, a lateral transfer platform 62, as illustrated in FIGS. 10 and 11, is incorporated into the line between guide track 108 and trough conveyor 64.

The transfer platform 62 provides a horizontal bed 176 for receiving the tube 22 and stocking cover 24 assemblies which are pushed piece against piece from the printer 60 along the guide track 108. FIG. 1 illustrates the mating of guide track 108 and transfer platform 62 with the track 108 positioned to smoothly deposit the tube 22 and cover on the bed 176. The bed 176 is supported by side plates 178 which are tied to the transverse frame 180 which is also a segment of the line base 174. The side plates are further tied across the front by a structural bar 182 and an inclined surface plate 184. The inclined plate 184 terminates at its lower end at a point which closely coincides with the top edge of one flight 186 of the flight conveyor 64. This inclined plate 184 guides the tube 22 and stocking cover 24 assemblies into the flights 186 as the flights 186 are indexed past. The tubes 22 and stocking covers 24 are moved onto the inclined plate 184 from the bed 176 upon contacting the limit switch 188. The switch 188 activates a plunger 190 which in turn pushes the tube 22 and stocking cover 24 over the guide bar 192 resulting in a gravity induced fall down the inclined plate 184.

A shaft 194 is journalled to flange bearings 196 on the inside faces of the side plates 178. This shaft 194 supports the conveyor drive sprocket 198 for the conveyor chain 200 as well as a driven sprocket 202 connected by a chain loop 204 to a motor-reducer drive 206. The chain 200 carries the flights 186 having generally "U" shapes with the legs pointing upward and flared outward and with the bottom attached to individual lengths of the chain 200. Both chain 200 and flight 186 are continuous to form the flight conveyor 64 when looped over the idler sprocket 208 (See FIG. 12).

The flight conveyor passes the nozzle-ram machine 68 in order to reach the idler sprocket 208. The nozzle-ram machine 68 is supported by the transverse frame 180 and terminates the line. As the tube 22 and stocking cover 24 assemblies approach the nozzle-ram machine 68, the ends of the stocking cover 24 are tucked into the tube 22 and tube cores 26 are positioned and aligned in the tube 22 over each of the ends of the stocking covers 24. Both of these operations are manual. With every two indexes of the trough conveyor, the rams 70 converge uniformly upon the tube cores 26 extending from the two tubes 22 within the confines of the rams 70, thereby inserting the tube cores 26 into the tubes 22 to form a filter unit 28. The pairs of nozzles 72 on each side of the trough conveyor operate in conjunction with the rams 70 to blow a high velocity stream of air through the inside of the filter units 28, after converging upon the units 28, to clean out any loose residual material. The pair of nozzles 72 which have the springs 214 mounted behind their face flanges 216 are movable along the axis of the nozzles 72. These nozzles are the air supply nozzles and are illustrated in the extended position maintained by the springs 214. The nozzles are forced against the springs 214 upon converging on the filter units and move into the nozzle body 218 to activate the flow of air. The result is that the air flow is only on when the face flanges 216 of the nozzles 72 are reasonably sealed against the filter units thereby conserving air at other times and directing it to the most efficient use. The indexing of the flight conveyor, advancing the tube 22 and stocking cover 24 assemblies two positions, is controlled by a signal activated by a forward and return pass of the shear 56 between the rollers 54 and 58 (see FIG. 5), and the converging of the nozzle-ram machine 42 is controlled by a signal generated by a cam on the shaft of idler sprocket 208 and limit switch combination which also stops the conveyor. The nozzle-ram machine 42 is retracted when the pressure therein builds up to within a 20 lb. differential of supply pressure.

The rams 70 consist of an angular plate attached to a common plate 220 on which both rams 70 and nozzles 72 are mounted. The common plates 220 are supported by the rail shafts 222 in a sliding manner by attached bushings 224. The motive force for the rams 70 and nozzles 72 is a power cylinder 226, air operated, acting through a pair of guide racks 228 and a free wheeling pinion 232 to assure that convergence from both sides toward the middle occurs. The nozzles 72 opposite the supply nozzles 72 are actually receivers for residual material having a collection box 230 attached to the back of both.

The present line machinery has now been described in its preferred embodiment, but should not be limited by this embodiment. Clearly, other means are available for cutting and conveying the tubes 22 to the drive roller 40, such as a shear, a trough and a pusher mechanism. A pusher mechanism plus an extractor could replace the rollers 40, 54 and 58. Further, other conveying means such as indexing fingers or a walking beam between fixed rails could be employed in place of the flight conveyor 64 calling for modifications to the transfer platform 62 as well.

Even more significant, while the preferred embodiment concerns itself with filter units 28, it is anticipated that the apparatus is useful for covering any cylindrical object with stocking material which can take the form of covers, coils, piles, etc.

The operation of the above machinery line is summarized in the following cycle. Tube stock 30 is fed into the combination saw-transfer table and rolls under the force of gravity down the inclined table 76 to the feeder indexing fingers 78. Upon a signal from the photocell 96 that the belt conveyor is free of tubes 22, both the feeder indexing fingers 78 and the discharge indexer 90 are rotated ninety degrees, thereby depositing tube stock 30 within the awaiting carrier hooks 82 and dropping previously cut pieces retained by the discharge indexer 90 onto the belt conveyor 34. The carrier hooks are rotated to pass the tube stock 30 through the saw blades 86 where the tube stock 30 is cut into sized tubes 22 and deposited on the inclined table 76 to roll under gravitational force to the discharge indexer 90. A limit switch activated by a cam (neither illustrated) on drum 84 retaining the carrier hooks 82 stops the rotation of the drum 84 indexing fingers 78 and discharge indexer 90. The tubes deposited on the belt conveyor 34 are transferred to the abutting guide track 108 and there engaged by the drive roller 40. The drive roller 40 engages each tube 22 and pushes the tube against a preceding tube through the dust collector 44 which cleans the outside surface of the tubes 22 and through the mandrel 46 in the operative position on the stocking machine 42. Upon being pushed out of the mandrel 46, the tubes 22 engage the stocking 48, covering the outside of the mandrel 46, on the inner wall of the stocking 48 thereby covering the tubes as they exit the mandrel. Both tubes 22 and stocking 48 are then individually engaged by the separating roller 54 being guided thereto by a continuation of the guide track 108 on the exit end of the stocking machine 42. The separating roller 54 drives the tube 22 and stocking 48 thereon at a speed exceeding the rate of advance of the tubes 22 driven by the drive roller 40 as the tubes 22 exit the mandrel 46. The difference in the speeds of the tubes 22 approaching and leaving the separating wheel 54 causes a separation between the tubes 22 within the stocking material 48. This separation is maintained by the traction roller 58 which turns at the same speed as the separating roller 54. The traction roller maintains tension on the stocking 48 between the rollers 54 and 58 to assure a clean cut of the flying shear 56 which passes through the stocking 48 when the separation between the tubes 22 within the stocking 48 is approximately centered on the shear 56. The shear 56 in making a forward pass severs the stocking 48 into stocking covers 24 which have ends overhanging the tubes 22. The shear 56 cuts another cover 24 upon the return pass by virtue of its double edge. The tube 22 and stocking cover 24 assemblies upon leaving the traction wheel are pushed piece against piece to the end of the guide track 108 where it abutts with the lateral transfer platform 62. As the pieces are advanced onto the transfer platform 62, they contact a limit switch 188 which in turn activates a plunger 190 which pushes them laterally off the bed 176 of the platform to fall by gravity down the inclined plate 184 into the flight 186 of the flight conveyor 64. The flight conveyor 64 is advanced two flights 186 for each forward and return pass of the flying shear 56 and advances the tube 22 and stocking cover 24 assemblies laterally toward the nozzle-ram machine 68. A sufficient length of conveyor 64 is provided between transfer platform 62 and nozzle-ram machine 68 to allow an attendant to insert both of the ends of the stocking covers 24 and to position and align tube cores 26 into both ends of the tubes 22. The attendant only positions and aligns the cores 26 within the tubes 22 for insertion by the rams 70. The rams 70 and nozzles 72 of the nozzle-ram machine 68 complete the cycle by the rams 70 converging on two tubes 22 at a time to push the extended cores 26 into the tubes 22 forming a filter unit 28, and by the nozzles 70 likewise converging on two filter units 28 at a time to blow out residual loose material from within the units 28 with high velocity air. To accommodate two pieces at a time, the nozzle-ram machine 68 is activated only upon the shear 56 returning to its starting position, having made two passes and indexed the flight conveyor 64 twice.

The present machinery line incorporates previously manually accomplished operations into a line process which approaches complete automation. The machinery line is a time saver due to its increased speed over the manual operations. The continuous nature of the process of the line makes the line more efficient. The higher speed and greater efficiency of continuous operations over individual manual operations results in a higher production of filter units 28. Further, the machine can perform the same operations absent the presence of an attendant at each operation, thereby requiring less working space due to the resulting compactness.

While the method of covering cylindrical articles has been described above in relation to the operation of the machinery line, it should be understood that the method could be practiced not only by other apparatus, but manually as well. Thus, cylindrical articles could be inserted into one end of a cylinder having its other end and outer surface covered with a continuous length of covering material. As a sufficient number of articles were inserted into the cylinder, the first article inserted and subsequent abutting articles would be forced to emerge from the covered end of the cylinder. The emerging article could then be grasped, while within the covering material, and both article and that portion of the covering material now upon the article could be pulled away from the cylinder. When the article had sufficiently cleared the cylinder, separation from the previously abutting article would also have occurred to allow the covering material to be sheared between this first article and the following article. Since the emerging article engages the inner wall of the overhanging covering material and carries the covering material along with it, both ends of the article now have covering material overhanging them. The overhanging material could be tucked into the hollow ends of the article and these ends could be retained by subsequently inserted tubular cores which force the ends of the covering material against the inner wall of the articles. This procedure can be repeated indefinitely as additional articles are inserted into the open end of the cylinder.

In accordance with the provisions of the patent statutes, the principle and mode of operation of the apparatus and the method of fabrication of sheathed cylinders have been explained and what is considered to represent their best embodiments have been illustrated and described. It should, however, be understood that the invention may be practiced otherwise than as specifically illustrated and described without departing from its spirit or scope.

We claim:

1. Apparatus for producing covered articles, comprising:
   means for directing a plurality of discrete lengths of articles along a path:
   means for applying a continuous length of covering material to the outer peripheral surface of said plurality of articles as the latter move along a predetermined portion of said path;
   means for at least momentarily changing the relative speed between those articles within said covering material and those articles not within said covering material whereby the adjacent ends of said articles within said covering material are separated; and
   means for severing said covering material intermediate the adjacent ends of said articles after said adjacent ends have been separated.

2. Apparatus defined in claim 1 wherein said directing means includes a guide track for guiding said articles.

3. Apparatus defined in claim 2 wherein said directing means further includes drive means for positively driving said articles in said guide track.

4. Apparatus defined in claim 3 wherein said drive means includes a driven roller having a peripheral surface for drivingly engaging said article.

5. Apparatus defined in claim 1 wherein sad means for applying the covering material includes a hollow open ended conduit encompassed by said covering material, said conduit being of sufficient cross sectional dimension to permit the passage of said articles therethrough.

6. Apparatus defined in claim 5 wherein said means for applying the covering includes means for moving said hollow conduit into and out of alignment with said directing means.

7. Apparatus defined in claim 6 wherein said means for applying the covering material includes a second hollow open ended conduit mounted on said moving means for alternate selective alignment with said directing means.

8. Apparatus defined in claim 1 wherein said separating means includes a driven roller for imparting movement to said articles within the covering material at a speed greater than the speed imparted thereto by said directing means to effect a separation of said articles within said covering material.

9. Apparatus defined in claim 1 wherein said severing means comprises a pair of knife blades and means to drive said blades with synchronized opposed motion whereby the cutting edges pass each other as they pass through the stocking.

10. Apparatus defined in claim 9 wherein said severing means includes means for moving said blade transversely with respect to the movement of said articles within said covering material.

11. Apparatus defined in claim 10 including driven roller means for maintaining separation of said articles within the covering material.

12. Apparatus defined in claim 1 wherein said articles are hollow and open ended cylinders.

13. Apparatus as defined in claim 12 including means for inserting tubular cores within the interior of said covered articles.

14. Apparatus defined in claim 13 wherein said inserting means includes a pair of opposing and converging rams located adjacent the ends of said articles.

15. Apparatus defined in claim 13 including means for applying pressure fluid to the interior of said articles subsequent to the insertion of said tubular cores.

16. Apparatus defined in claim 15 wherein said means for applying fluid pressure includes a nozzle adapted to seat on the end of said article.

17. Apparatus defined in claim 16 including a second nozzle opposing said first nozzle for receiving the pressurized fluid emitted by said first nozzle subsequent to the passage thereof through the interior of said hollow covered articles.

18. Apparatus defined in claim 17 wherein said first and second nozzles are movable toward and away from one another.

19. Apparatus for producing covered cylindrical articles comprising:
   a hollow cylindrical housing having an inlet and an outlet;
   a source of discrete lengths of cylindrical articles;
   a first driven roller means engaging the outer surface of said cylindrical articles for imparting movement thereto through said cylindrical housing from the inlet to the outlet thereof;
   a source of covering material for said cylindrical articles surrounding said cylindrical housing;
   a second driven roller means disposed at the outlet of said cylindrical housing engaging said covering and said cylindrical articles as said articles emerge from the outlet of said housing to impart movement thereto at a speed greater than the speed imparted by said first driven roller means to effect a separation between adjacent ends of said articles within said covering material;
   a third driven roller means imparting movement to said articles within said covering material at a speed equal to the speed imparted by said second driven roller means to maintain separation of said articles within said covering material; and
   means for severing said covering material in the region between the separated ones of said articles.

20. The method of covering articles, comprising:
   directing a plurality of discrete lengths of articles along a path;
   applying a continuous length of covering material to the outer peripheral surface of said plurality of articles;
   at least momentarily changing the relative speed between those articles within said covering and those articles not within said covering so that said articles within said covering material are separated; and severing said covering material intermediate the adjacent ends of said separated articles.

21. The method according to claim 20 wherein said articles are hollow and open ended and including the following steps:
   tucking the ends of said covering material into the open ends of said hollow open ended articles; and
   inserting tubular cores into at least one end of said open ended articles to engage said covering material ends between the inside of said open ended articles and said cores.

22. The method according to claim 21 including the step of cleaning the outside of said articles before covering said articles.

23. The method according to claim 21 including the step of applying fluid pressure to the interior of said hollow open ended articles.

24. The method of assembling filter units, comprising:
   cutting tubular stock of fiber glass material into discrete lengths;
   cleaning the outside of said tubes;
   directing a plurality of discrete lengths of said tubes to the interior of an extended length of an outer covering;
   at least momentarily changing the relative speed between those articles within said covering and these articles not with said covering so that said tubes within said covering material are separated;
   severing said covering material intermediate the adjacent ends of said separated tubes;
   tucking the ends of said covering material into the open ends of said tube;
   inserting perforated metallic tube cores into each end of said tube to engage the end of said covering material between the inside of said tube and the outside of said cores; and
   applying a pressurized fluid to the interior of said covered tubes.

* * * * *